United States Patent

[11] 3,603,085

| [72] | Inventors | Mario Parmegiani<br>San Donato, Milanese;<br>Anacleto Clementi, Saronno, both of, Italy |
|---|---|---|
| [21] | Appl. No. | 706,139 |
| [22] | Filed | Feb. 16, 1968 |
| [45] | Patented | Sept. 7, 1971 |
| [73] | Assignee | Snam Progetti, S.p.A.<br>Milan, Italy |
| [32] | Priority | Feb. 17, 1967 |
| [33] | | Italy |
| [31] | | 12759 A/67 |

[54] PROCESS FOR THE PRODUCTION OF ETHYLENE OXIDE
5 Claims, 1 Drawing Fig.

[52] U.S. Cl. .................................................. 60/39.02,
260/348.5
[51] Int. Cl. ..................................................... F02c 3/00,
C07d 1/14
[50] Field of Search........................................... 260/348.5;
60/39.18, 39.02, 39.03, 39.46, 39.12

[56] References Cited
UNITED STATES PATENTS

| 2,718,755 | 9/1955 | Heller.......................... | 60/39.18 |
| 3,037,346 | 6/1962 | Davis........................... | 60/39.02 |
| 3,140,153 | 7/1964 | Huckins ....................... | 260/348.5 |
| 2,648,950 | 8/1953 | Miller.......................... | 110/28 X |
| 2,888,804 | 6/1959 | Yellott et al. ................. | 110/28 |
| 3,241,933 | 3/1966 | Ploum et al. ................. | 48/196 |

Primary Examiner—Douglas Hart
Attorney—Ralph M. Watson

ABSTRACT: A process for producing ethylene oxide wherein a portion of the gases produced in the process are combusted with supplementary fuel to produce products of combustion that drive a gas turbine-air compressor. The compressed air from the air compressor is returned to the ethylene oxide reactor to be used in the production of ethylene oxide.

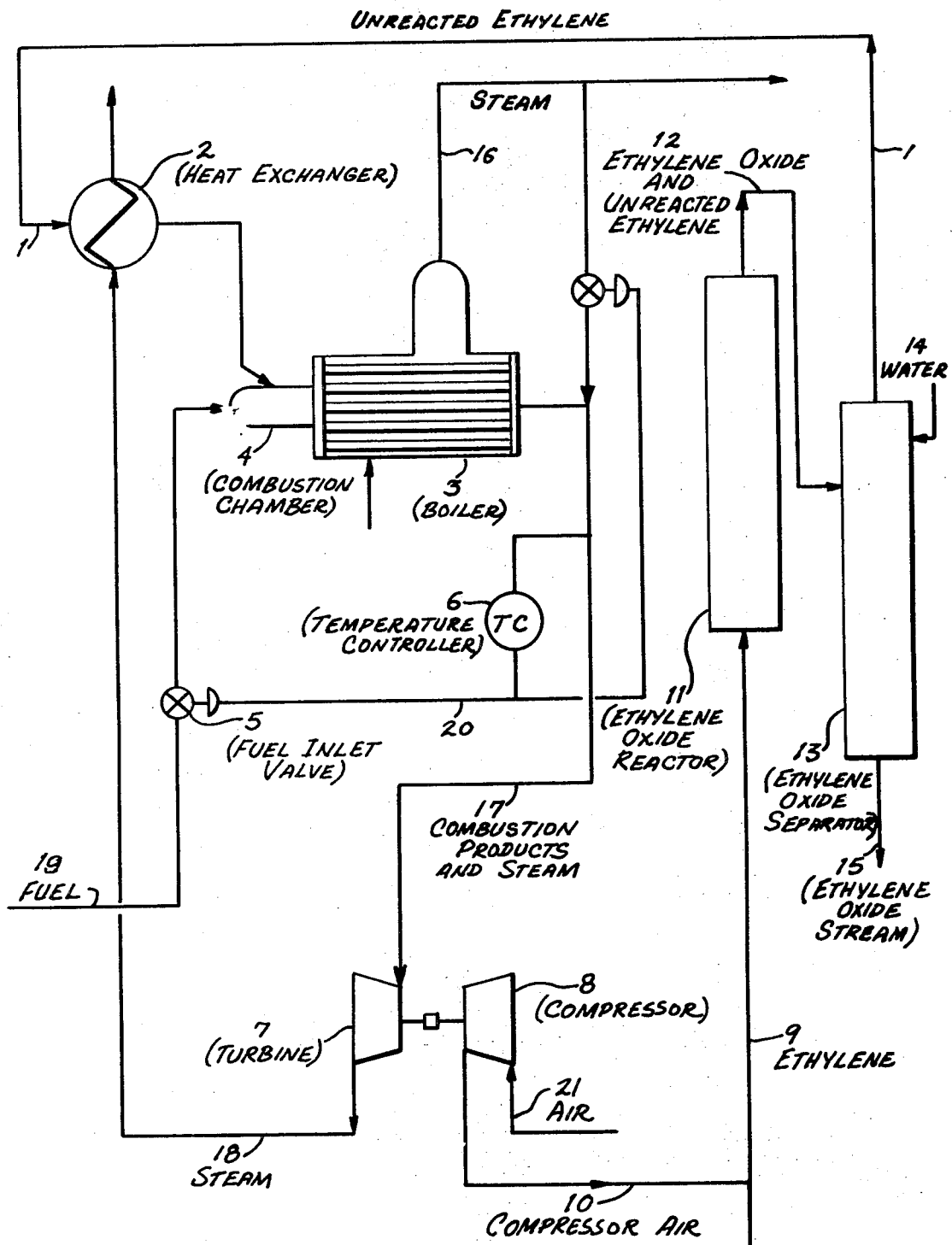

PROCESS FOR THE PRODUCTION OF ETHYLENE OXIDE

CROSS REFERENCE TO RELATED APPLICATIONS

A patent application filed by Mario Parmegiani and Oreste Bellofatto, Ser. No. 750,644; filed Aug. 6, 1968) also relates to a process for producing ethylene oxide wherein a portion of the reaction products are used to generate high-pressure air for use within the system.

This invention relates to a process for the production of ethylene oxide.

A process is known for producing ethylene oxide by the direct oxidation of ethylene, the process comprising reacting air and ethylene at a high temperature and pressure in a catalytic reactor having a fixed bundle tube-type bed and regulated by a thermostat using a diathermic liquid. The gaseous product flowing from the reactor is then passed into an absorption column wherein the resulting ethylene oxide is recovered. It has been found desirable to recycle a portion of the gases passing out the column to the reactor, fresh air and ethylene being simultaneously added to the reactor, whereas the remainder of the gases passing out from the column (being equivalent in volume to the fresh air and ethylene added to the recycled portion) is discharged to the atmosphere. It is known that the discharged gases, which mainly comprise nitrogen, oxygen and carbon dioxide, also contain unreacted ethylene in an amount usually of from 0.1 to 3 percent, more usually of from 0.5 to 1.5 percent by volume.

The discharged gases are available at a pressure, which, apart from any small pressure losses present, is very similar to the pressure existing in the catalytic oxidation reactor, this pressure being that to which the air has been compressed.

It is therefore desirable, in order to make the process as economic as possible, to recover either the mechanical energy of the discharged gases, or to recover the unreacted ethylene contained therein.

It is interesting to note the fact that the amount of discharged gases is approximately equal to the amount of compressed air necessary for the reaction less the quantity of reacted oxygen and any losses.

Known processes for the recovery of the energy available in the discharged gases have not been completely satisfactory from the economic point of view.

Processes proposed for this purpose relate only to the recovery of the potential energy of the discharged gases by letting the heated gases expand through an expansion turbine which is connected to the compressor which compresses the air used in the oxidation process. The ethylene present in the gases is also a source of loss in this arrangement.

Whilst it might be convenient to raise the temperature of the gases as high as possible before their expansion in the turbine in order to produce a noticeable change in enthalpy, it must be remembered that an air-ethylene mixture becomes explosive if brought to too high a temperature. Also, the use of a conventional furnace to moderately heat the exhaust gases before their expansion, entails a further loss of energy represented by the sensible heat contained in the exhaust gases which necessarily have to be discharged to the atmosphere.

In order to eliminate unreacted ethylene from these gases, processes of catalytic combustion have been proposed, but these processes have been found to be impracticable, partly on account of the fact that the content of ethylene in the exhaust gases is not constant, and also since it is impossible to foresee the magnitude or the frequency of the ethylene content variations. Thus, it frequently happens in practice, that the ethylene content in the exhaust gases is too high for the stability of the catalyst. This is related to the practically adiabatic character of the calatytic oxidation of the ethylene in such conditions.

Thus the proposed catalytic systems for eliminating the ethylene have the drawback of being effective only when using low ethylene contents and when operating within narrow limits, which conditions rarely occur in practice.

It is an object of the present invention to provide an effective process for recovering a substantial proportion of the mechanical energy contained in the discharged gases and utilizing it so as to provide the energy necessary for driving the compressor of the process air.

A further object of the present invention is to provide a process which utilizes the combustion heat of the ethylene contained in the exhaust gas to preheat the same gases before their expansion in the turbine.

According to the present invention there is provided a process for the continuous production of ethylene oxide, which comprises oxidizing ethylene with the oxygen present in air at an elevated pressure in the presence of a suitable catalyst thereby producing the desired ethylene oxide, separating all or substantially all of the ethylene oxide from the resulting discharge gases which contain unreacted ethylene, subjecting at least a portion of the remaining discharge gases to combustion in a combustion chamber at a controlled temperature and pressure, whereby the pressure of the said remaining discharge gases is increased, and allowing the same to expand in an expansion turbine connected to a compressor whereby compressed air for use in the catalytic oxidation of the ethylene is produced.

For a better understanding of the present invention and to show how the same may be carried into effect, reference will now be made, by way of example, to the accompanying drawing which is a diagrammatic representation of a plant for the combustion of unreacted ethylene and the subsequent stages of the process of the present invention.

Referring now to the accompanying drawing, there is shown a pipe 1 leading from an ethylene oxide reactor 11 in which the catalytic oxidation of ethylene to ethylene oxide is effected in a manner known per se. Ethylene feed in the ethylene oxide reactor 11 is supplied through line 9. The discharge gases from the ethylene oxide reactor 11 are passed through line 12 to anethylene oxide separator 13 where the ethylene oxide is completely or substantially completely removed in a known manner. A line 14 is provided to supply water to the ethylene oxide separator 13 to aid in the separation process. The separated ethylene oxide discharges from the ethylene oxide separator 13 through line 15 while the unreacted ethylene is passed through line 1 to a heat exchanger 2. The unreacted ethylene in line 1 is usually at a temperature of from 10° to 50° C. and at a pressure of from 15 to 25 atmospheres, but is heated in the heat exchanger 2 by the hot gases leaving an expansion turbine 7. The discharge gases are led from to heat exchanger 2 to a combustion chamber 4 provided with fuel feeding, the fuel being controlled by a fuel inlet valve 5 in line 19 which is controlled by a temperature regulator or temperature controller 6 connected between the inlet port of the expansion turbine 7 and the outlet port of the combustion chamber 4, the arrangement being such that the fuel feeding is regulated by the desired outlet temperature which is generally in the range of from 600° to 750° C.

The gases leaving the combustion chamber 4 are at a sufficient pressure and temperature to expand through the turbine 7 which drives the compressor 8 used for compressing the process air. Ideally, the mechanical energy developed by the expansion of the gases in the turbine 7 is substantially equal to that necessary for operating the process air compressor 8. The compressed air generated in the compressor 8 is delivered through line 10 to the ethylene feed line 9 to serve as the stem process air. Air is supplied to the compressor 8 through inlet line 21.

The gases flowing from the turbine 7 are passed through line 18 to the hot side of the heat exchanger 2, then discharged to the atmosphere. The heat contained in the turbine discharge gas is recovered in the heat exchanger 2.

A compromise between the thermal requirements imposed by the combustion and those imposed by the turbine may be reached by making use of a thermic damper which consists of a boiler 3 wherein steam is produced which may be sent through lines 16 and 17 to the expansion turbine together with the gases flowing from the combustion chamber 4. Line 17 conveys the combustion gases from the combustion chamber 4 to the turbine 7.

The advantage of the arrangement according to the prevent invention is the substantial independence of the combustion on the content of ethylene in the exhaust gases. Also the ethylene is eliminated by combustion and therefore does not cause explosion problems before its expansion in the turbine.

The tolerance of higher amounts of ethylene than usual in the exhaust gases makes the synthesis process less critical and more utilizable even when a loss of activity in the synthesis catalyst has occurred.

Moreover, the process according to the present invention allows the compression cycle in the synthesis of ethylene oxide to be made without using auxiliary motors.

We claim:

1. In a process for the continuous production of ethylene oxide by oxidizing ethylene in a reactor with oxygen present in air at an elevated pressure in the presence of a catalyst in which ethylene oxide is separated from the discharge gases issuing from the reactor, the improvement comprising:
   directing a portion of the discharge gases containing unreacted ethylene to a combustion chamber;
   measuring the temperature and pressure of the combustion products issuing from the combustion chamber;
   delivering a supplemental fuel to the combustion chamber as a function of the temperature and pressure of the combustion products;
   delivering the combustion products from the combustion chamber to a gas turbine coupled to drive an air compressor; and
   delivering the high-pressure air from the air compressor to the ethylene oxide reactor for use as the process air in the ethylene oxide production process.

2. A process according to claim 1 wherein the supplemental fuel added to the combustion chamber is determined by measuring the temperature of the combustion gases to insure admission thereof into the turbine at temperatures within the range of 600° to 750° C.

3. A process as in claim 1 comprising the further step of passing the gases which are discharged from the turbine in heat exchange relationship with the reactor discharge gases entering the combustion chamber.

4. A process as in claim 2 comprising the further step of passing the gases which are discharged from the turbine in heat exchange relationship with the reactor discharge gases entering the combustion chamber.

5. A process as in claim 4 wherein the unreacted ethylene in the discharge gases is from 0.1 to 3 percent by volume.